I. D. CANTRELL.
SEED PLANTER.
APPLICATION FILED SEPT. 5, 1913.

1,108,130.

Patented Aug. 25, 1914.
2 SHEETS—SHEET 1.

WITNESSES

INVENTOR
I. D. Cantrell.
BY
ATTORNEYS

I. D. CANTRELL.
SEED PLANTER.
APPLICATION FILED SEPT. 5, 1913.
1,108,130.
Patented Aug. 25, 1914.
2 SHEETS—SHEET 2.
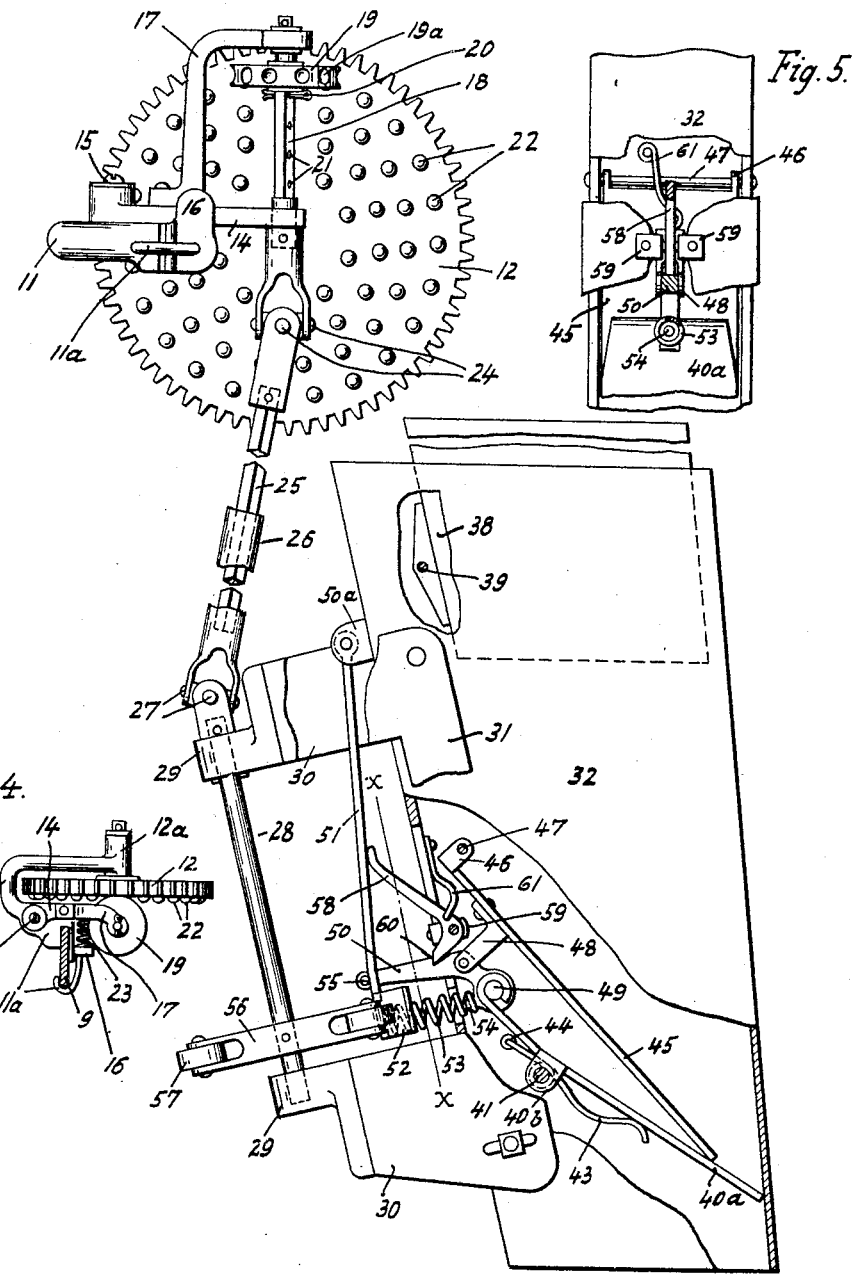
WITNESSES:
INVENTOR
I. D. Cantrell
ATTORNEY

UNITED STATES PATENT OFFICE.

ISAAC D. CANTRELL, OF AUBREY, TEXAS.

SEED-PLANTER.

1,108,130.  Specification of Letters Patent.  Patented Aug. 25, 1914.

Application filed September 5, 1913. Serial No. 788,269.

*To all whom it may concern:*

Be it known that I, ISAAC D. CANTRELL, a citizen of the United States, residing at Aubrey, in the county of Denton and State of Texas, have invented certain new and useful Improvements in Seed-Planters, of which the following is a specification.

My invention relates to new and useful seed planters, and has the nature of an improvement upon the planter covered in my pending application filed Nov. 29th, 1912, under Serial No. 734186.

The principal object of my invention is to provide a planting machine mounted upon a wheeled frame adapted to form a furrow and drop a predetermined quantity of seed at predetermined intervals into the furrow, the seed dropping mechanism being actuated from the axle of the frame.

A further object of my invention is to provide easily adjusted means for varying the intervals between the seed discharging operations.

Finally, the object of my invention is to provide a machine of the character described comprising a novel and highly efficient mechanism for effecting the above mentioned purposes, the construction being extremely simple and durable.

Figure 1:
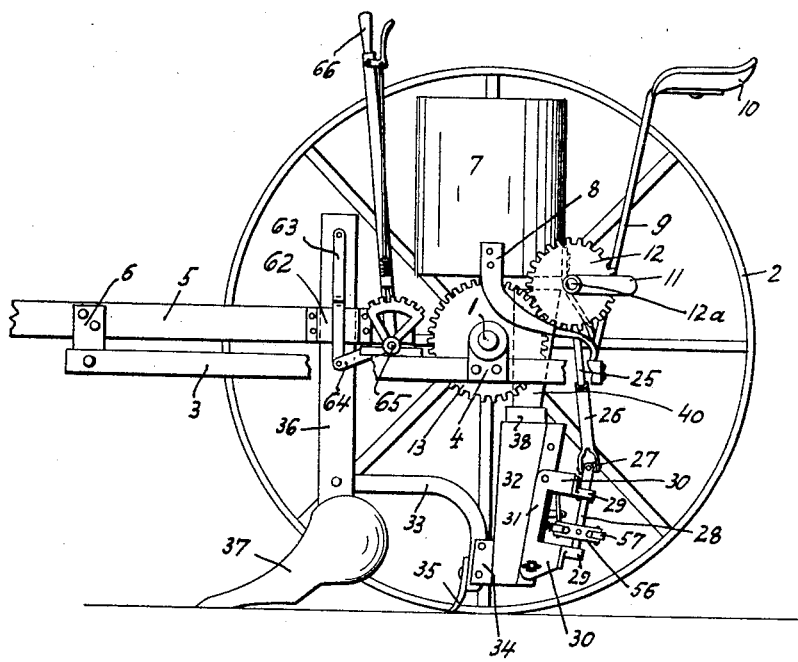
Figure 2:
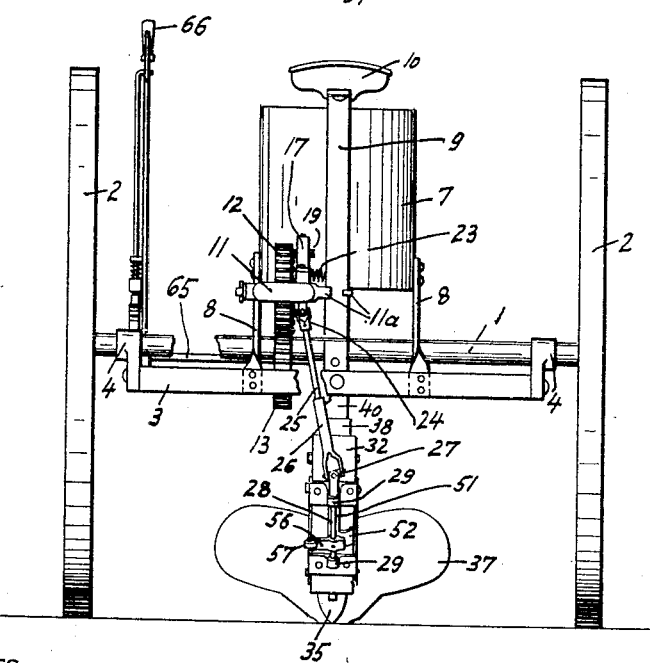

With these and various other objects in view, my invention has relation to certain novel features of the construction and operation, an example of which is described in the following specification, and is illustrated in the accompanying drawings, wherein:

Figure 1 is a view showing in side elevation a planter in which are embodied the novel features constituting my invention.
Fig. 2 is a view of the same in rear elevation. Fig. 3 is a view drawn to an enlarged scale showing the seed chute and mechanism for controlling the valves or doors thereof removed from the planter frame and in side elevation. Fig. 4 is a plan view of a portion of the mechanism for controlling the valves or doors of the seed chute. Fig. 5 is a detail sectional view taken upon the line X—X of Fig. 3.

Referring now more particularly to the drawings wherein like reference characters designate similar parts in all the figures, the numeral 1 denotes the axle and 2 the transporting wheels of my planter. The planter frame 3 is hung at its rear end upon the end portions of the axle by means of brackets 4, and at its forward end is attached to the tongue 5 as indicated at 6. Centrally above the axle, there is mounted a seed can or hopper 7 supported by three bracket members 8 fastened upon the rear end of the frame 3. Upon the rear end of the frame 3, there is also mounted a post 9 carrying at its upper extremity a driver's seat 10. To the lower portion of the post 9, there is secured a substantially U-shaped bracket 11, one arm of said bracket being preferably clamped to the post 9 as indicated at 11$^a$. Between the two arms of the bracket 11, there is rotatably mounted a gear 12 journaled parallel to the axle 1 in one of the arms as indicated at 12$^a$. With the gear 12 there is intermeshed a gear 13 mounted fast upon the axle 1 beneath the seed can. Upon that arm of the bracket 11 which carries the clamping means, there is also mounted a forwardly extending arm 14, pivoted as indicated at 15. The arm 14 is free to undergo a slight angular displacement about its pivoted extremity, this displacement being limited at one side through contact of the arm with a knob 16 integrally formed upon the bracket 11, and being limited at the other side by the gear 12 in a manner presently to be explained. A coiled spring 23 connecting the arm 14 with the knob 16 exerts a pressure upon the arm 14 tending to force the same toward the gear 12. Upon the pivoted end portion of the arm 14, there is rigidly mounted a vertical bracket arm 17 having its upper end portion bent forwardly at a right angle. The free extremities of the members 14 and 17 furnish bearings for journals formed upon a square vertical shaft 18, upon which is loosely mounted a novelly constructed pinion 19, the central aperture of which conforms to the shape of the shaft 18. The pinion 19 is adapted to be adjusted in various positions, in which positions it is supported by a cotter pin 20 which may be introduced into any one of several apertures 21 provided transversely in the shaft 18. The face of the pinion 19 is formed with a plurality of equally spaced semi-spherical depressions 19$^a$ in place of teeth. In each of its positions of adjustment, the depressions 19$^a$ of the pinion 19 are adapted to engage with a separate circular series of protuberances 22, which are concentrically formed upon that face of the gear 12 to which the pinion 19 is adjacent. The spring 23 serves, during the use of my planter, to hold the pinion 19 pressed firmly against the adjacent face of the gear 12, so that the depressions 19ᵃ of said pinion may be properly engaged by a certain series of said protuberances 22.

The lower end of the shaft 18 projects downwardly slightly beyond the arm 14 and has connection through a universal joint 24 with the upper extremity of an extensible shaft comprising a square upper member 25 and a lower member 26 formed with a square interior aperture receiving the member 25. The lower extremity of the member 26 is connected through a universal joint 27 with the upper end of a substantially vertical shaft 28. The extremities of the shaft 28 are journaled in a pair of bearings 29 which are secured to the U-shaped end portions 30 of a certain bracket, said portions 30 being connected by parallel and integral vertical strips 31. The bracket comprising the parts 30 and 31 is secured to a seed chute 32 at the rear thereof, the members 31 being respectively secured to the side walls of the chute. The lower end of the chute 32 is rigidly secured at its front side to the rear extremity of a member 33, the securing means being indicated at 34. The fastening means 34 serves to hold the chute 32 in a substantially vertical position. The member 33 has the nature of a shovel plow standard curved intermediate of its ends through a right angle, one of its portions being extended forwardly and the other downwardly. The downwardly turned portion carries upon its extremity a shovel plow 35 which serves to open a small furrow to receive the seed discharged from the seed chute 32. The forward extremity of the standard 33 is attached to the lower portion of a vertical plow standard 36 carrying a middle breaker 37 upon its lower end. The upper extremity of the standard 36 is mounted upon the rear end of the tongue 5. The middle breaker or double mold-board 37 serves to break the ground in front of the shovel plow 35, and is commonly used upon planters.

In the top portion of the chute 32, there is mounted a short spout 38, which spout is pivoted in the front part of the chute upon a rod 39 passing through the chute parallel to the axle. Into the spout 38, there projects the lower extremity of a comparatively long spout 40 terminating at its upper end just beneath the seed can, and adapted to receive the discharge from the seed can. The two spouts 40 and 38 will conduct the seeds from the seed can to the seed chute 32.

In the bottom portion of the chute 32, there is mounted a valve or door 40ᵃ, inclined downwardly from its rear to its forward edge. The valve or door 40ᵃ is pivotally mounted at its upper portion by lugs 40ᵇ oppositely upon its lateral edges, through which lugs is passed a pintle 41 parallel to the axle, the extremities of said pintle being mounted in the side walls of the chute. In order to normally hold the valve or door 40ᵃ in a closed position and return it to such a position after having been opened, a spring 43 is coiled upon the pintle 41, one end of which spring acts upwardly upon the valve or door 40ᵃ beneath the same, while the other end of the spring is fixed by passing it through an aperture 44 in one of the side walls of the chute.

A short distance above the valve or door 40ᵃ, there is mounted another valve or door 45 similarly inclined, and pivotally mounted at its upper extremity by forming lugs 46 oppositely upon the lateral edges of said valve or door, through which lugs, there is passed a pintle 47 parallel to the axle and supported by the side walls of the chute. Upon the under side of the valve or door 45 adjacent to the upper edge, there is rigidly mounted a bracket 48, which projects rearwardly just above the upper end of the valve or door 40ᵃ. The upper edge of the valve or door 40ᵃ is crimped around a rod 49, between which rod and the bracket 48 a swinging connection is established by one end portion of a member 50 having its other end portion projecting rearwardly through an aperture in the chute 32. The function of this rearwardly extending portion of the member 50 will presently be explained.

Upon the upper portion of the rear wall of the chute 32, there is mounted a small bracket 50ᵃ upon which is pivoted the upper end of a bar 51 terminating at its lower end just above the lower member 30. The bar 51 is formed at its lower end with a laterally projecting portion 52 curved slightly toward the chute from its fixed to its free end. To the member 52, there is secured one end of a coiled spring 53, passing through the rear wall of the chute 32, the other extremity of which is fitted over a knob 54, formed upon the member 50, adjacent to its point of connection with the rod 49. Under normal conditions the spring 53 holds the lower end of the bar 51 spaced some distance from the chute, this distance being limited by a pin 55 mounted in the rear end of the member 50 and extending behind the lower end of the bar 51. Opposite the member 52, there is mounted fast upon the shaft 28 the middle of a transverse arm 56 having two rollers 57 respectively journaled in its extremities. Once in each revolution of the shaft 28, each roller 57 will contact with the member 52, subjecting the member 51 to an angular displacement and placing the spring 53 under compression. When the spring 53 is thus placed under compression, its tendency is to shift the member 50 into the chute, simultaneously opening the valve or door 40ᵃ and closing the valve or door 45. This tendency is temporarily overcome by a latch member 58 of bell-crank shape, pivotally mounted in a slot in the rear wall of the chute upon a small bracket 59 secured to said wall. The latch member 58 has a long upwardly extending arm, contiguous at its extremity with the front face of the bar 51, and has a short downwardly inclined arm, which normally engages in a recess 60 in the top edge of the member 50. A wire spring 61, engaging the long arm of the latch member 58 impresses upon said member a tendency to angular displacement such as to hold the short arm engaged in the recess 60. But as the bar 51 is moved toward the chute, through contact of one of the rollers 57 with the member 52, the member 58 will be subjected by the bar 51 to an angular displacement such as will dislodge its shorter arm from the recess 60, after the spring 53 has been considerably compressed. The spring 53 will then instantaneously force the doors 40ᵃ and 45 respectively to their opened and closed positions, allowing them to return to their normal positions an instant later when the member 52 is freed from the roller 57 engaging the same.

A mechanism employed to simultaneously produce vertical adjustment of the middle breaker 37, shovel plow 35 and chute 32 will now be described.

The standard 36 is mounted to slide vertically between the rear end of the tongue 5 and a plate 62 secured thereto. From the top of the standard which projects some distance above the tongue, a pivoted bar 63 extends downward and at its lower end has pivoted connection with an arm 64 fast upon a rock-shaft 65 transverse of the machine. Upon the rock-shaft is also mounted fast the lower end of a lever 66 by which the rock-shaft may be manually actuated. With the lever is correlated the usual means for holding the same adjusted in various positions of angular displacement as it is apparent from the foregoing description that the standard 36 and parts carried thereby will be adjusted upwardly or downwardly according as the lever 66 is subjected to a rearward or forward swinging displacement.

The particular construction described and shown for vertically adjusting the parts 37, 35, 32, etc., is not claimed as new, but my invention is particularly adapted for use in conjunction with some such adjusting mechanism.

In the operation of my planter, the usual mechanism in the seed-can will, at regular intervals, discharge certain small quantities of seed into the chute 32 through the members 38 and 40. Thus seed will accumulate upon the valve or door 40ᵃ until the same undergoes one of its periodic displacements, permitting the seed to discharge. While the seed is discharging, the valve or door 45 will be closed, catching any seed entering the chute during the momentary opening of the valve or door 40ᵃ. The latch mechanism comprising the member 50 and the spring 53 insures a rapid action of the valves or doors 40ᵃ and 45 in opening and closing. The mechanism actuating the valves or doors is such that the time intervals between the discharge of seed will be practically without variation, so that the seed will be planted at practically equal space intervals. When the lever 66 is manipulated, the chute 32 will be free to shift vertically, since the shaft comprising the parts 25 and 26 is extensible and the spout 40 may telescope into the pivoted spout 38.

The invention is presented as including all such changes and modifications as properly come within the scope of the following claims.

What I claim is:

1. A seed planter comprising a wheeled frame, a seed-can mounted upon said frame, a seed chute receiving the discharge from the seed-can, valves or doors mounted in the seed chute, a shaft mounted upon the seed chute, a variable speed mechanism communicating a constant rotation from the axle to said shaft during the travel of the planter, an arm transverse with said shaft mounted at its center upon the shaft, rollers mounted in the extremities of said arm and a mechanism correlated with the valves or doors periodically acted upon by said rollers during the rotation of said shaft, actuating the valves or doors.

2. A seed planter comprising a wheeled frame, a seed-can mounted upon said frame, a seed chute receiving the discharge from the seed-can, an upper and a lower valve or door mounted in the bottom portion of the seed chute, the upper valve or door being normally opened and the lower valve or door being normally closed, a spring tending, under compression, to simultaneously close the upper valve or door and open the lower one, a shaft mounted upon the seed chute, means carried by said shaft for periodically compressing said spring during the rotation of the shaft, means preventing the valves or doors from yielding under said spring until a compression of the same has been effected, and a variable speed mechanism communicating a constant rotation to said shaft from the axle during the travel of the planter.

3. A seed planter comprising a wheeled frame, a seed-can mounted upon said frame, a seed chute receiving the discharge from the seed-can, a pair of valves or doors mounted one above the other in the bottom portion of the seed chute, the upper valve or door being normally opened and the lower valve or door normally closed, a swinging connection between said valves or doors, a spring intimately associated with the swinging connection tending, when under compression, to close the upper valve or door and open the lower one, a latch member acting upon said swinging connection holding the same against the pressure of said spring, a shaft mounted upon the chute, means carried by the shaft periodically compressing said spring during rotation of the shaft and releasing the swinging member from the latch member when the spring is compressed, and a mechanism communicating a constant rotation to the shaft from the axle during the travel of the planter.

In testimony whereof I have signed my name to this specification in the presence of two subscribing witnesses.

ISAAC D. CANTRELL.

Witnesses:
 MAYBELLE REAVES,
 JACK A. SCHLEY.

Copies of this patent may be obtained for five cents each, by addressing the "Commissioner of Patents, Washington, D. C."